United States Patent [19]

Dehait et al.

[11] 4,082,463
[45] Apr. 4, 1978

[54] CALIBRATED OPTICAL MICROMETER

[75] Inventors: Jack T. Dehait, Dayton; David C. Dietz, Xenia; Milo S. Snyder, Xenia; Francis M. Taylor, Xenia, all of Ohio

[73] Assignee: Systems Research Laboratories, Inc., Dayton, Ohio

[21] Appl. No.: 757,217

[22] Filed: Jan. 6, 1977

[51] Int. Cl.² .............................................. G01B 11/00
[52] U.S. Cl. .................................... 356/167; 250/224
[58] Field of Search ....................... 356/158, 160, 167; 250/224

[56] References Cited

U.S. PATENT DOCUMENTS

| 3,758,214 | 9/1973 | Mangelsdorf | 356/167 |
| 4,043,673 | 8/1977 | Harris et al. | 356/160 |

Primary Examiner—John K. Corbin
Assistant Examiner—Wm. H. Punter
Attorney, Agent, or Firm—Biebel, French & Nauman

[57] ABSTRACT

A method and apparatus for calibrating an optical micrometer utilizes a precisely dimensioned grate which is temporarily introduced into the optical path of the instrument within its zone of measurement. A beam of light is scanned through the zone of measurement and across the grate, and the information obtained therefrom is recorded in an electronic memory. Thereafter, articles subsequently placed within the zone of measurement are scanned by the beam, and the information obtained therefrom is compared against the calibration data to provide an accurate measurement of the article.

4 Claims, 9 Drawing Figures

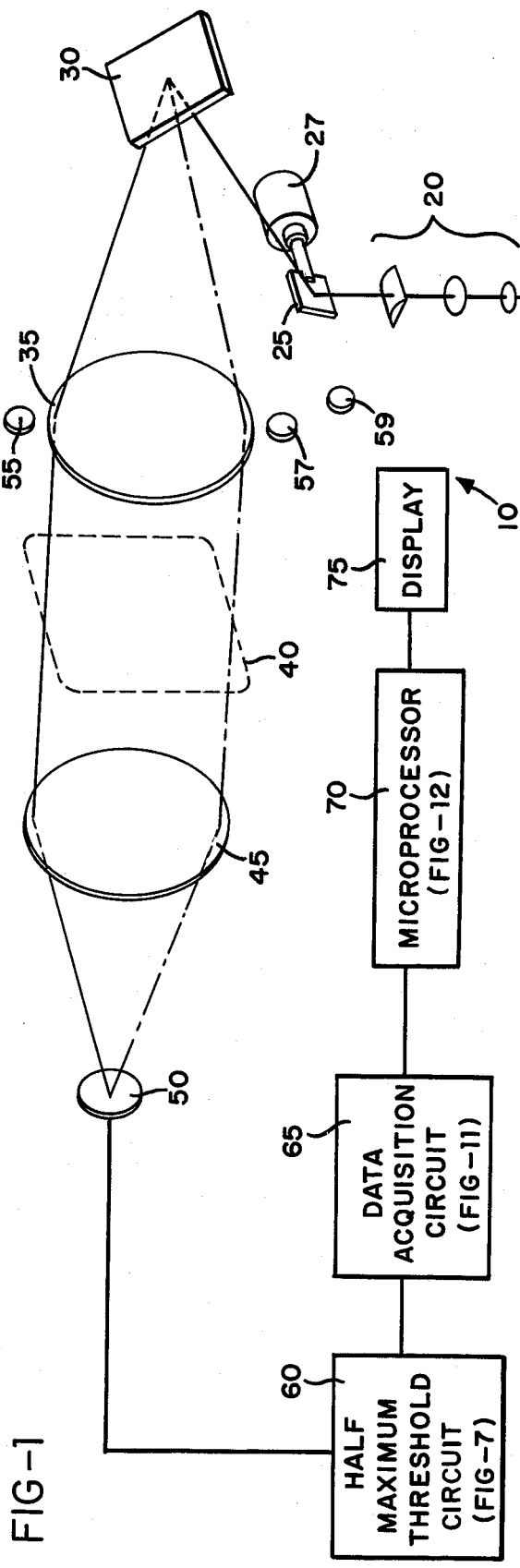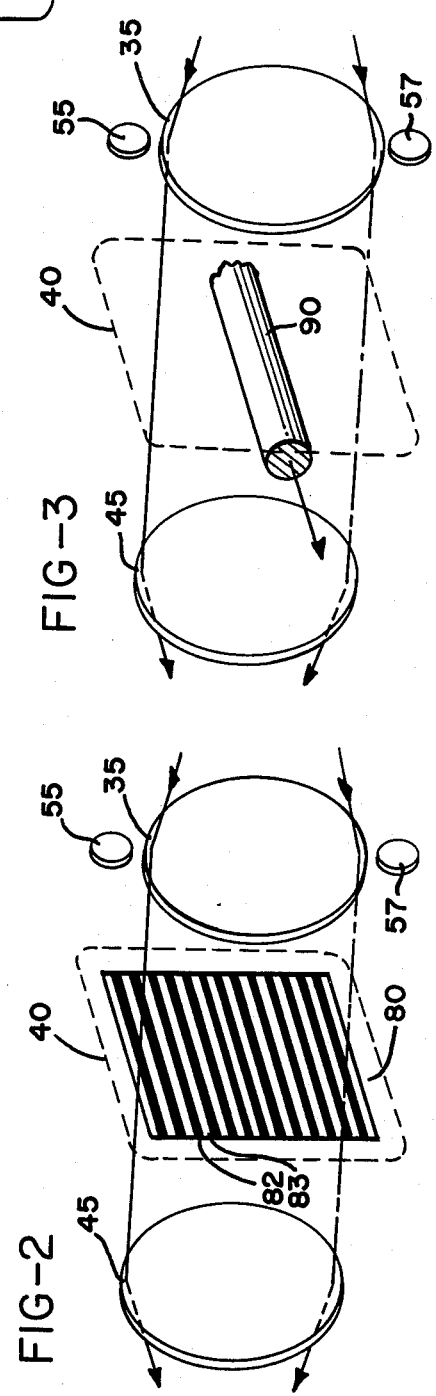

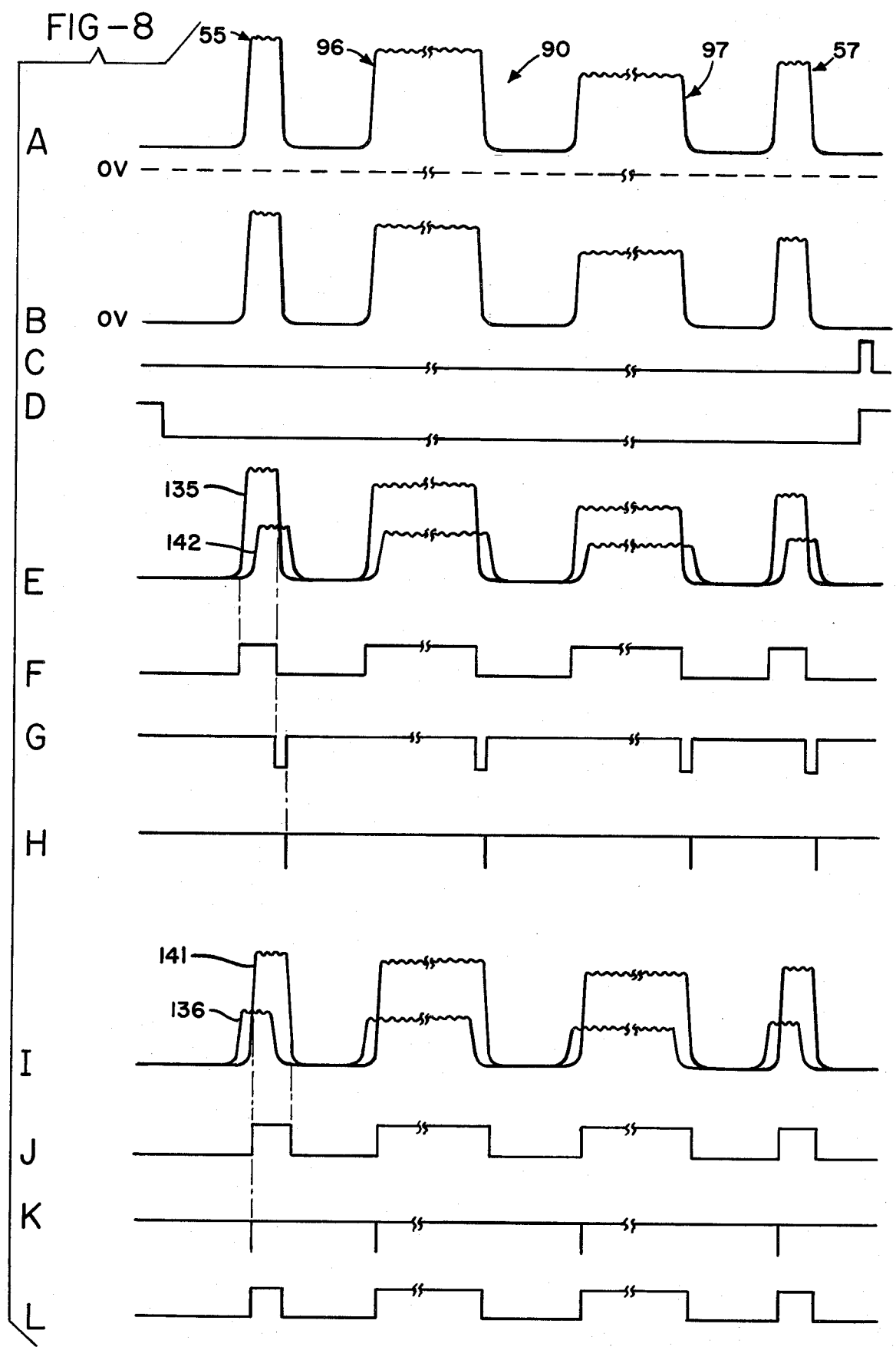

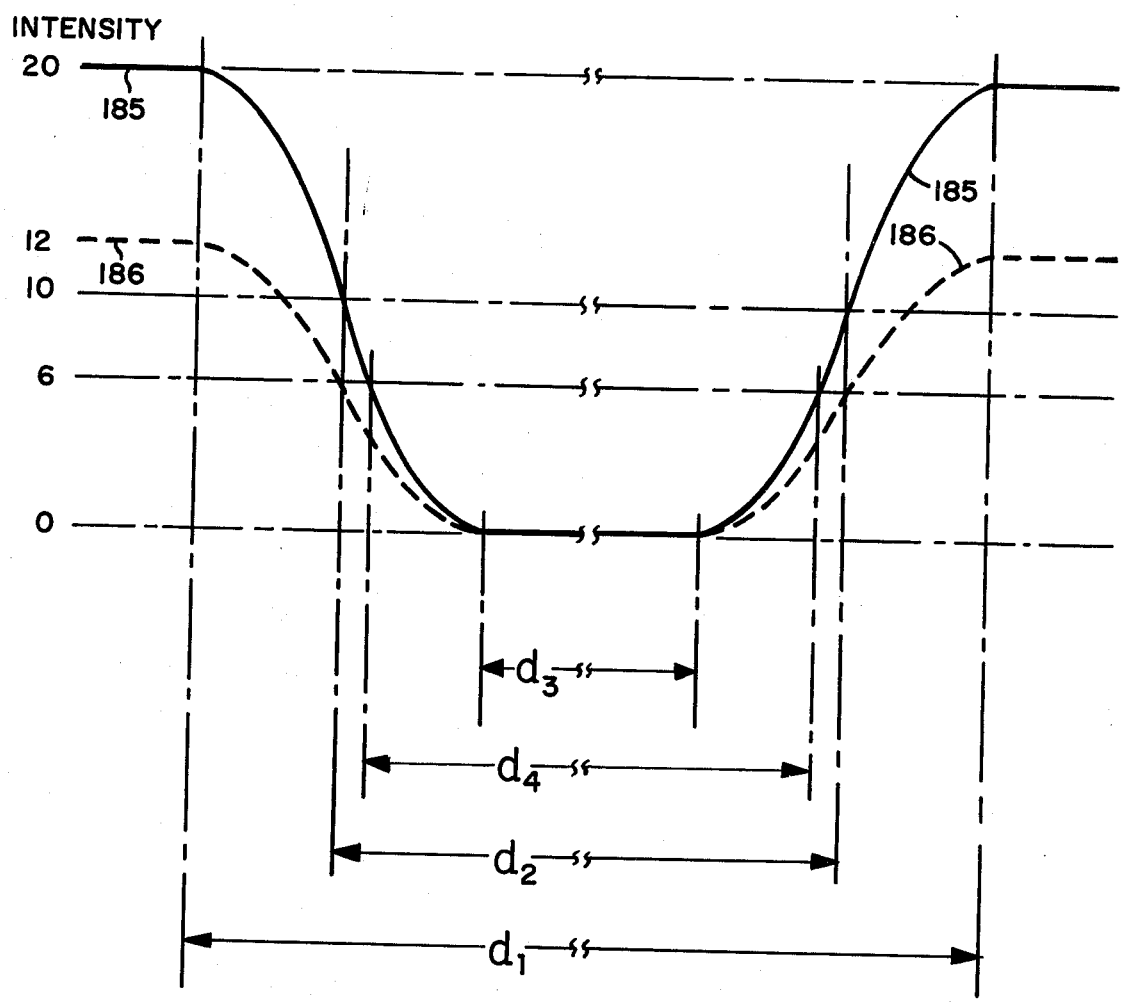
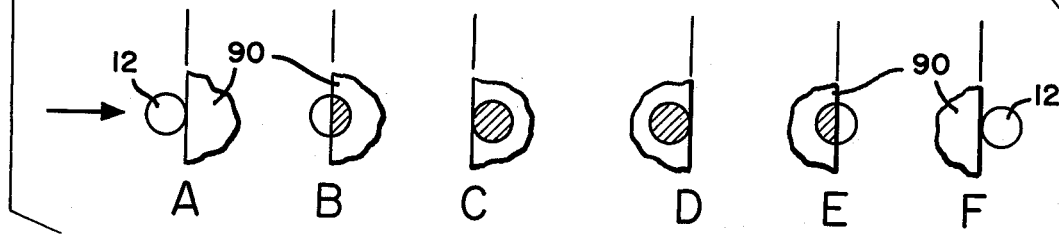

CALIBRATED OPTICAL MICROMETER

BACKGROUND OF THE INVENTION

This invention relates to non-contact optical dimension gauging instruments, commonly referred to as optical or laser micrometers.

Optical micrometers are especially useful when it is desired to measure the dimension of articles without physically contacting the articles. Examples of optical or laser micrometers are shown in the following U.S. Pat. Nos.
3,812,685,
3,565,774,
3,592,545,
3,743,428,
3,853,406,
3,961,838,
3,856,411,
3,856,412,
3,868,437,
3,870,890,
3,905,705.

The accuracy to which prior art optical micrometers measure the dimension of the article placed within the zone of measurement has depended in part upon the linearity of the optical system, the stability of the scanning mechanism and high frequency clocks, or in maintaining the relationship between calibrating devices and the measurement path.

SUMMARY OF THE INVENTION

This invention relates to a method and apparatus for calibrating an optical micrometer by using a precision grate temporarily placed within the zone of measurement of the instrument, generating and storing calibration data by scanning the grate, and thereafter determining the dimensions of articles subsequently placed in the zone of measurement by reference to the stored calibration data.

In accordance with this invention, the same optical path and environment are used for both calibration and measurement, and therefore the accuracy of the system is not dependent upon maintaining an accurate and stable relationship between two separate optical paths.

In the preferred embodiment of the invention, a laser generates a narrow beam of light which is caused to scan vertically through a zone of measurement by means of a rotating mirror and associated lenses. The beam is preferably focused to a narrow line within a zone of measurement, and then directed onto a photodetector element. The size of an object or article within the zone of measurement is determined by the amount of time the beam is interrupted by the article in its path.

In some prior art devices, such as shown in U.S. Pat. No. 3,765,774, a pulse generator was used to control the rotation of the motor connected to the scanning mirror, and it was assumed that the beam scanned linearly through the zone of measurement. In the present invention, however, it is not necessary that the scan rate be linear throughout the zone of measurement, but it is only necessary that any nonlinearity of the scan rate be determined during the calibration of the instrument, and that the beginning and end of each scan cycle be determined accurately.

In the preferred embodiment, a calibrating grate is installed within the zone of measurement where the article to be measured is normally placed. The grate is provided with a plurality of alternate light transmitting and opaque segments spaced a predetermined distance apart, typically 0.100 inch, and the beam is caused to scan across this calibrating grate during the calibration scan cycle. A high frequency clock provides a series of equally spaced pulses, and the total number of pulses which occur during the calibration scan cycle ($Nt$) are recorded along with the number of pulses occurring in the interval between the beginning of the calibrating scan cycle and each segment of the grate. These numbers are recorded in a memory of a microcomputer, and in the preferred embodiment of the invention, this memory is nonvolatile, that is, this calibration information will be permanently recorded for later use and does not require the constant application of electrical power to the instrument.

Thereafter, the dimension of an article placed in the zone of measurement can be determined by temporarily recording the number of clock pulses occurring in the interval between the beginning of the measurement scan cycle and the first edge of the article (N1) and the number of pulses ocurring in the interval as the beam scans from the first to the last edge of the article (N2). The total number of clock pulses occurring during the measurement scan cycle (N3) is also recorded and compared to the total pulses in the calibration scan cycle, and this ratio ($Nt/N3$) is multiplied times the numbers N1 and N2 to obtain adjusted numbers N'1 and N'2 which are independent of the rate at which the beam scans during the measurement scan cycle.

These adjusted numbers are then compared with the table developed during the calibration scan cycle to determine the relationship of the edges of the article relative to the location of the segments of the grate previously recorded to thereby obtain an accurate dimension for the article.

The invention also includes means for improving the accuracy in determining when the beam crosses the edge of an article or a segment of the calibration grate. This is accomplished by an electrical circuit which determines when the intensity of the beam, as represented by the electrical output from the sensing photodetector, reaches its one-half power point value. One-half amplitude value will occur at the same time or at the same position of the beam with respect to the edge of the article and is independent of the beam intensity, and will therefore provide an accurate means to determine the edges of the article.

Accordingly, it is an object of this invention to provide a method and apparatus for calibrating an optical micrometer of the type described above wherein a precisely dimensioned grate is temporarily introduced to the optical path of the instrument within its zone of measurement, and the information obtained when this grate is scanned by the beam is recorded and thereafter used as a reference from which the dimensions of articles subsequently placed in the zone of measurement can be determined.

These and other objects and advantages of the invention will be apparent from the following description, the accompanying drawings and the appended claims.

BRIEF DESCRIPTION OF THE DRAWINGS

FIG. 1 is a diagrammatic view of an optical micrometer and a block diagram of the electrical system for processing dimension information;

FIG. 2 is a partial diagrammatic view showing a calibration grate positioned in the zone of measurement;

FIG. 3 is a partial diagrammatic view showing the article to be measured situated within the zone of measurement;

FIG. 8 are waveform diagrams showing electrical signals at several locations within the circuitry of FIG. 7;

FIG. 9 is a waveform illustrating the passage of the scanning beam across the edges of an object placed in the zone of measurement;

FIGS. 10A-10F illustrate the physical relationship of the scanning beam with the article;

DESCRIPTION OF THE PREFERRED EMBODIMENT

Figure 4:
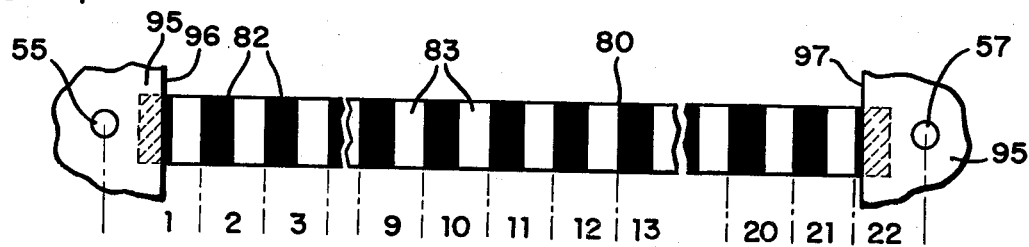
FIG. 4 is a view showing a calibration grate placed in the zone of measurement and the photodetectors for detecting the beginning and end of each scan.

Reference is made to FIG. 1 which is a diagrammatic view of an optical micrometer constructed according to this invention. The optical micrometer, shown generally at 10, includes means for generating a beam 12 for collimated light, such as a laser 15, and may include an optical system 20 to modify the beam of light in accordance with the type of material to be measured and the environment in which that measurement is to be made. The beam is reflected off a mirror 25 rotated by means of motor 27 and is further directed by a stationary mirror 30 through a scan lens 35, a zone of measurement, shown generally at 40, a second scan lens 45 and onto a photodetector element 50.

Also included are photodetector elements 55 and 57 which detect the beam prior to and after it moves vertically through the zone of measurement; and thus the outputs of these photodetectors represent the beginning and end of each scan cycle. Photodetector 59 senses that the laser is operating and that the motor 27 is actually rotating the mirror 25 and thus causing the beam to scan vertically, in the embodiment shown in FIG. 1, through the zone of measurement.

Figure 7:
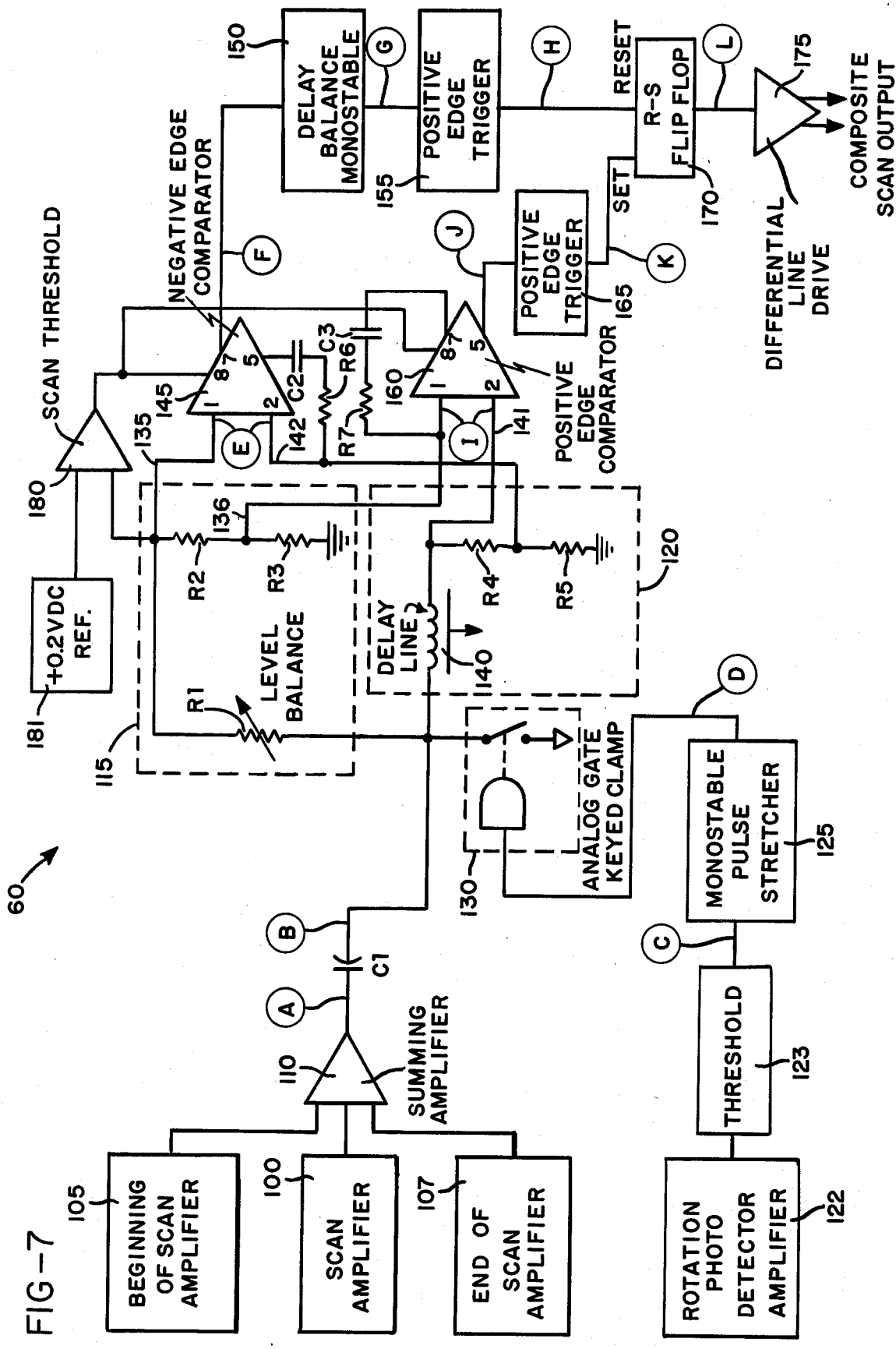
FIG. 7 is an electrical diagram of a half-maximum threshold circuit.
Figure 11:
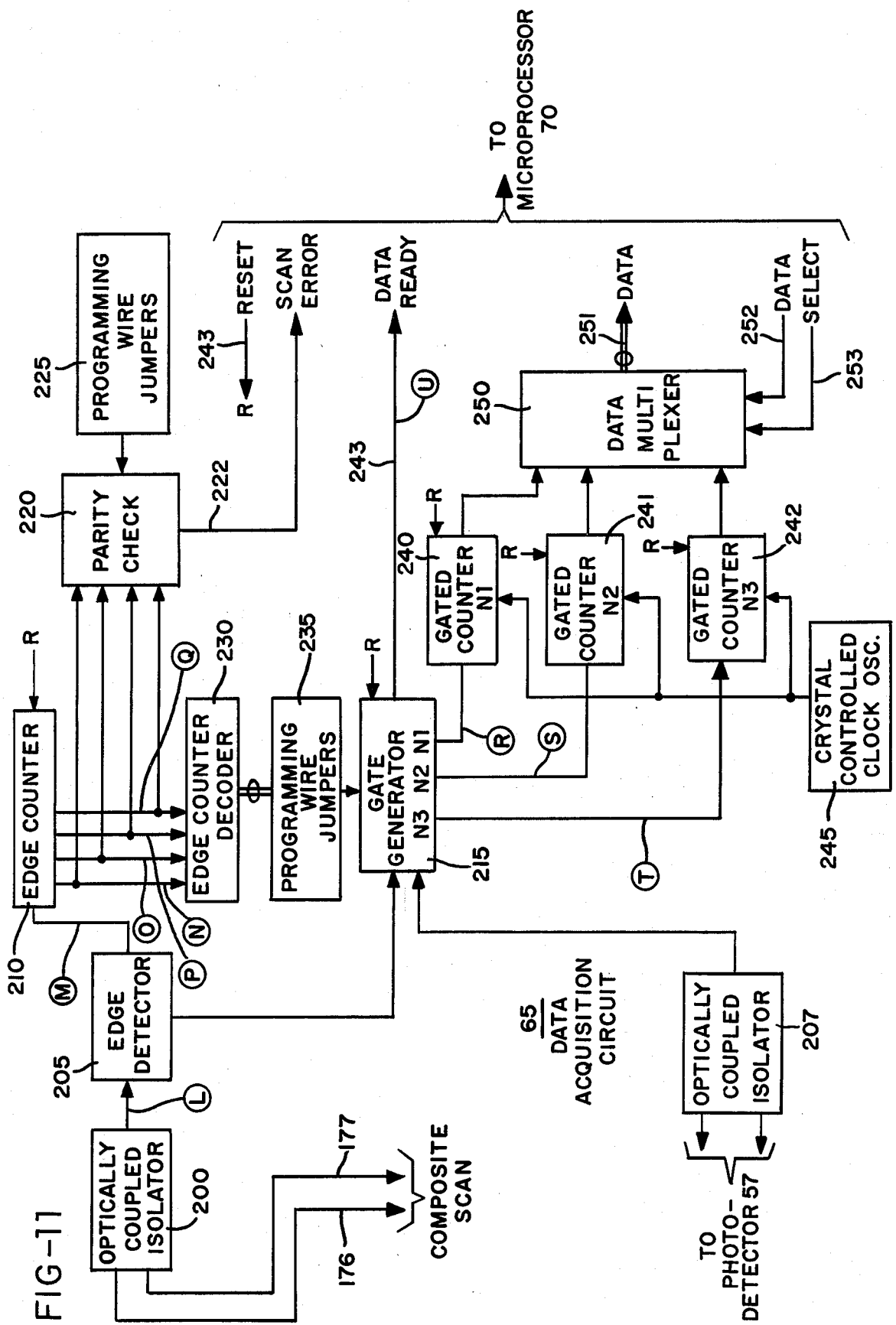
FIG. 11 is an electrical diagram of a data acquisition circuit.
Figure 12:
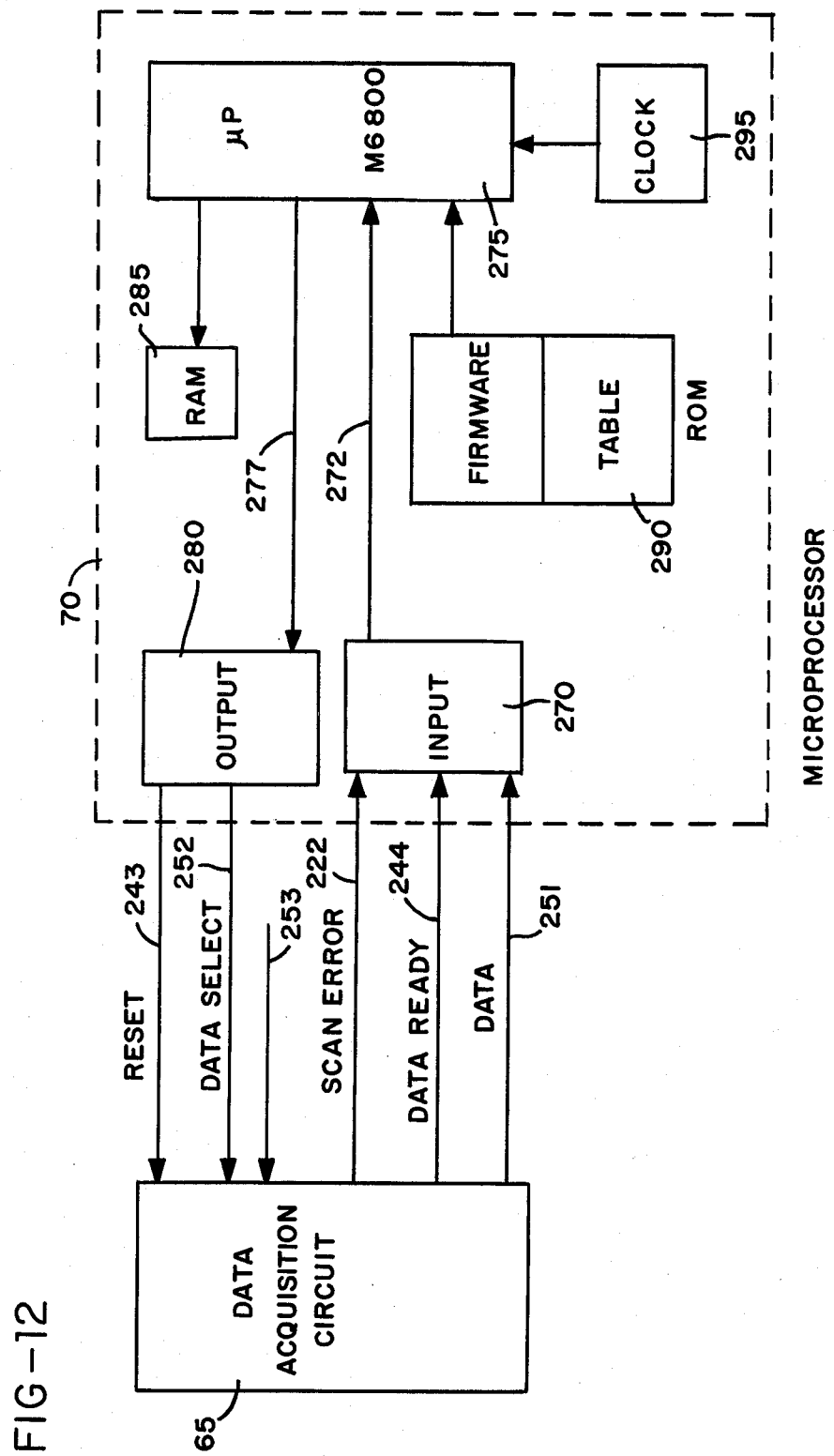
FIG. 12 is an electrical block diagram of a computer means for linearizing the output of the optical micrometer using data previously obtained from the grate temporarily positioned within the zone of measurement.

The outputs of the photodetectors 50, 55 and 57 are applied to the half-maximum threshold circuit 60 which is more completely shown in FIG. 7; the output of this device is applied to a data acquisition circuit 65, more completely shown in FIG. 11; and the output of the circuit 65 is applied to the microprocessors 70, more fully shown in FIG. 12. The dimension of the article placed within the zone of measurement may be determined visually by means of display 75.

In FIG. 2, a grate 80, which preferably includes alternate opaque and light transparent segments 82 and 83, is temporarily positioned within the zone of measurement, and the beam is caused to scan vertically downwardly across the photodetectors 55 and 57 and through the grate 80 onto photodetector 50 to produce output signals which can then be used to linearize the measurement of an article, such as a wire 90 placed in the zone of measurement, shown in FIG. 3.

The grate is preferably a precision optical device which, as shown in FIG. 4, includes twenty-two segments which are spaced in the preferred embodiment at intervals of 0.100 inch. As will be explained, the exact dimensions of these segments are known and this information is stored in a computer which uses this information to provide an accurate measure of the dimension of an article, regardless of its position within the zone of measurement and any non-linearities existing in the optical system.

In FIG. 4, the beam is presumed to scan from left to right, and the beam therefore crosses the beginning-of-scan photodetector 55, which is physically mounted within the housing 95 of the optical micrometer, a portion of which is shown, the edge 96 of the opening within the housing, across each segment of the grate 80, across the other edge 97 of the opening in the housing and then the end-to-scan photodetector 57.

Referring now to FIG. 7 which is a schematic electrical diagram of the half-maximum threshold detector 60, and FIG. 8 which is set of waveforms showing the electrical signal at various parts of the circuit, the scan photodetector element 50 is connected to amplifier 100, and the beginning of scan photodetector 55 and end of scan photodetector 57 are connected to amplifiers 105 and 107, respectively. The outputs of these amplifiers are connected to a summing amplifier 110, the output of which, shown as waveform A in FIG. 8, is capacitively coupled through capacitor C1 (see waveform B) to a first circuit means 115 and a second circuit means 120.

The rotation photodetector 59 is connected through an amplifier 122 to a threshold detector circuit 123, and its output (waveform C) is applied to a monostable pulse stretcher circuit 125. As long as the laser 15 is activated and the mirror 25 is rotating, periodic pulses of light applied to the photodetector 59 will cause an output (waveform D) from the monostable pulse stretcher 125 after the scan cycle, and thus the output of the summing amplifier 110 may be applied to the first and second circuit means 115 and 120.

The analog gate keyed clamp circuit operates to ground the input to the first and second circuit means 115 and 120 prior to the beginning of each scan cycle thereby to establish a zero volt DC reference level. Because of leakage currents through the photodectors and the output voltage of those photodetectors due to stray light, the minimum voltage output of the summing amplifier 110 might be as much as ten percent of the amplitude of the maximum output signal. Accuracy of the measurement is therefore improved by shorting the output of capacitor C1 to ground, thereby establishing a zero reference prior to each scan cycle.

The first circuit means 115 includes level balance potentiometer R1 and a voltage divider, including resistors R2 and R3. This circuit provides two voltage outputs; the first on line 135 which represents the composite output signal of the summing amplifier, as modified by the level potentiometer R1; and the second on line 136 which is a fixed percentage of the composition output signal. In the preferred embodiment of the invention, the voltage on line 136 is one-half of the voltage on line 135.

The second circuit means 120 includes a delay line 140, the amount of delay being sufficient to allow the signal from each of the photodetectors to transition from its highest to lowest level of the slowest scan rate anticipated during the operation of the instrument. In the embodiment shown, the delay is one microsecond. The second circuit means also includes a voltage divider including resistors R4 and R5; and this circuit therefore provides a first output on line 141 representing the delayed composite signal and a second output on line 142 representing a fixed percentage of the delayed composite signal. Again, this fixed percentage is the same as the fixed percentage in the first circuit means, and in the preferred embodiment is one-half the full output voltage.

The circuit 60 shown in FIG. 7 also includes a first comparator circuit 145 which is responsive to the first output on line 135 of the first circuit means 115 and to the second input on line 142 of the second circuit means 120. The inputs to this circuit are shown in waveform E of FIG. 8; and its output is illustrated by waveform F. This circuit 145 is a negative edge comparator, that is, it will produce an output on the trailing or negative going edge of the signal on line 135 when the voltage thereon equals the voltage on line 142.

The output of the first comparator circuit 145 is applied to a circuit means 150 for delaying this output by a time equal to the delay provided by the delay line 140, as shown by waveform G, and this pulse is applied to a positive or leading edge trigger circuit 155, the output of which is shown by the waveform H in FIG. 8.

Similarly, a second comparator circuit 160 is provided with the second or one-half value output on line 136 from the first circuit means 115 and the full magnitude signal from the second circuit means 120 as it appears on line 141. This input is shown by the waveform I in FIG. 8. The second circuit means is a positive edge comparator, that is, it will produce an output on the leading or positive going edge of the signal on line 141 when the value of that signal equals the signal on line 136; and its output is shown by the waveform J in FIG. 8. This signal is applied to a positive or leading edge trigger 165, and its output is shown by the waveform K in FIG. 8.

An output circuit means or flip-flop 170 is provided in the circuit 60 of FIG. 7 for combining the delayed output of the first comparator circuit means (waveform H), and the output of the second compartor means (waveform K) to provide a composite signal which represents accurately when the beam intensity reaches one-half its maximum intensity as the beam scans across the edge of the article thereby to provide an accurate representation of the dimension of the article within the zone of measurement independently of any changes in the intensity of the beam or the electrical output signals from the photodetector and associated amplifiers which represent the intensity of the beam.

The leading edges of each pulse shown in the waveform F of FIG. 8, and the trailing edge of each of the pulses shown in the waveform J are due to the action of the scan threshold circuit 180 of FIG. 7 which compares the composite scan signal, waveform B, as its appears on line 135 against a reference voltage from source 181. This circuit disables the edge comparators when there is no output from any of the photodetectors and thus prevents the circuits 145 and 160 from producing outputs due to noise in the absence of photodetector outputs.

The edge comparator circuits 145 and 160 are preferably type LM 361 comparators manufactured by National Semiconductor. The circuit 145 is provided with a feedback circuit comprising capacitor C2 and resistor R6; and the circuit 160 is provided with a similar feedback circuit comprising capacitor C3 and resistor R7. In both feedback circuits the voltage on input pin #1 will momentarily be reduced at the time a comparison is obtained between pins #1 and #2; and this momentary reduction of input voltage will prevent multiple firings due to variations in the voltage on slowly rising signals on the pin #2 input. Since an AC coupling is provided, this reduction of voltage at the time of firing is only momentary, and the feedback circuit does not therefore suffer from the same errors normally encountered when using DC hysteresis.

FIGS. 9 and 10A-10F illustrate the passage of a beam 12 across one edge of the article 90 being measured and a resulting electrical waveform produced by the photodector 50.

In FIG. 10A, the beam 12 is shown tangent the article 90, and the full intensity of the beam is therefore applied to the photodetector 50. In this example, the beam will move horizontally from left to right, and as the beam scans toward the right, the intensity of the light at the photodetector will begin to decrease, as shown by the waveform 185 in FIG. 9. When one-half of the beam is obscured by the article, as shown in FIG. 10B, one-half of the intensity is received by the photodetector, which produces only one-half the maximumm electrical output as compared to the full amplitude signal from that particular beam intensity. As the beam continues to move, the intensity of the light will further decrease, and finally reach zero when the beam is completely obscured as shown in FIG. 10C.

No light is received by the photodetector 50 as the beam continues to move across the article, and therefore its output will remain at zero until just after the beam reaches the position shown at FIG. 10D at which time the light from the beam which is detected by the photodetector 50 will begin to increase. When the beam is only half obscured, half of its intensity will reach the photodetector 50. Of course, it is not possible to determine the half intensity value until after the beam has reached its full intensity, and that occurs after the entire beam has cleared the object, as shown in FIG. 10F.

Thus, the dimension D1 is determined by the size of the article and the size of the beam in its direction of movement and represents the first and last contact of the beam with the article. The dimension D2 represents the size of the article and is determined by when the beam intensity reaches its half-maximum amplitude. The dimension D3 is also determined by the size of the beam and represents a dimension when the beam is completely blocked by the article.

In FIG. 9, the waveform 185 represents a full intensity beam having a maximum amplitude, for example, of twenty units. The waveform 186, on the other hand, represents a waveform from a lower intensity beam, and this waveform is shown having a maximum amplitude of approximately twelve units. This reduced amplitude may be caused by many factors, including, but not limited to, an attenuation of the light output due to the characteristics of the optical system; dust, dirt, and moisture within the zone of measurement; and changes in line voltage and in the laser output.

It is clear from FIG. 9 that if the half-maximum value of either of waveforms 185 or 186 is used, the dimension measurement D2 will be the same, and therefore this can be relied upon as an accurate indication of the dimension of the article within the zone of measurement. If, however, a fixed threshold voltage were established as an indication of the beam passage across the edge of the article, for example six units, then the dimension D4 would represent the size of the article when the beam intensity were full, as represented by waveform 185, while dimension D2 would represent the size of the article when the intensity of the beam was at the amplitude represented by waveform 186.

Accordingly, by using the one-half maximum amplitude value of the beam, regardless of its actual amplitude, an accurate and repeatable measurement of the dimension of an object placed in the zone of measurement can be made.

In the example given above, the beam is shown in FIG. 10 to be circular; however, it is to be understood that the beam could be in any shape and the technique disclosed here used.

Figure 6:
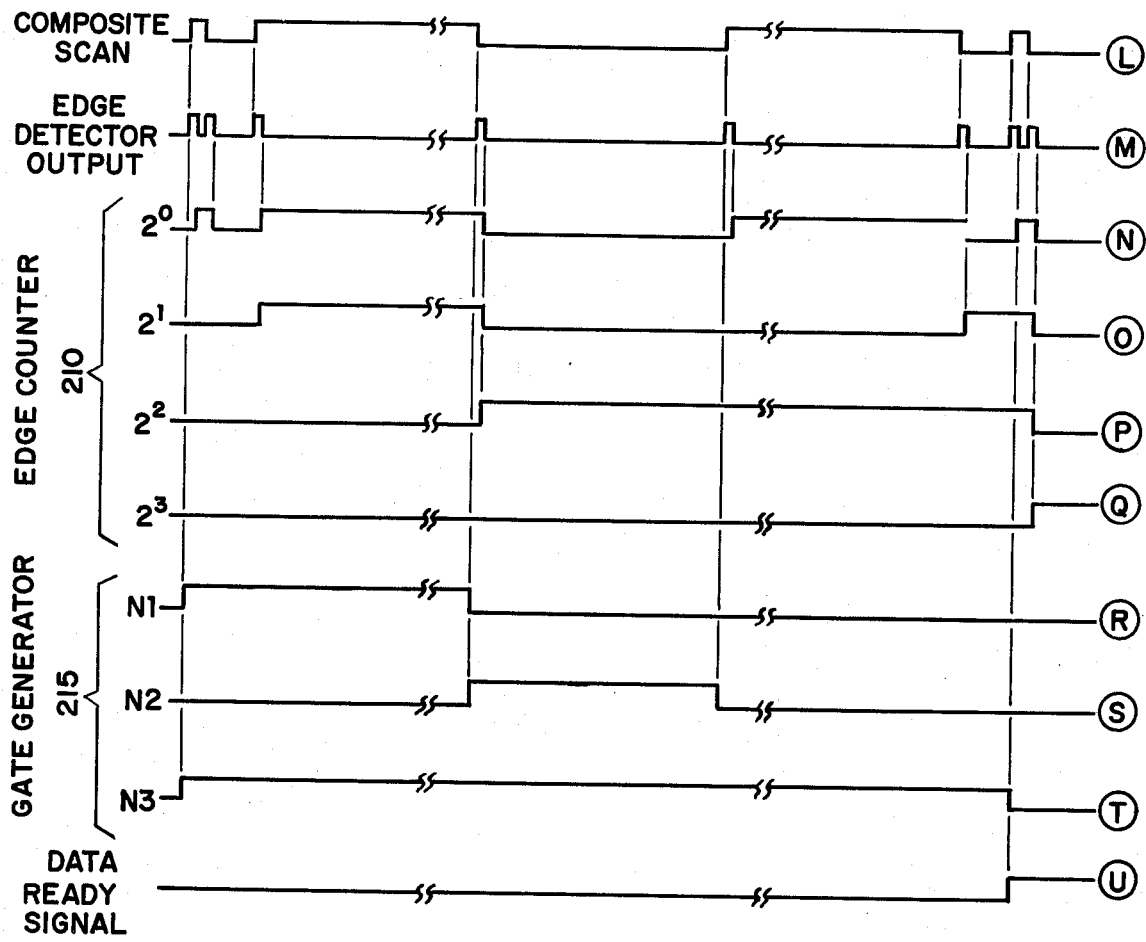
FIG. 6 shows waveform diagrams representing the output of various electrical components included in the preferred embodiment of the invention.

Referring now to the high speed acquisition circuit shown in FIG. 11, this circuit receives the composite, processed waveform L, shown in FIGS. 6 and 8, from the half-maximum threshold circuit 60 of FIG. 7, and identifies the location of the three dimensions from which the size of the article within the zone of measurement can be determined. The composite signal is applied on lines 176 and 177 to an optically coupled isolator circuit 200, the output of which is applied to edge detector 205. An end-of-scan signal from photodetector 57 is applied to optically coupled isolator 207, and its output is a raw, unprocessed signal which is used to control the operation of other components within the circuit 65.

The optically coupled isolators 200 and 207 are included to provide a high degree of noise immunity and electrical isolation to the system. The edge detector 205 provides a standarized pulse for every transition, either positive or negative, appearing at its input; and this circuit includes two outputs, one of which is applied to the edge counter 210, the other applied to a gate generator 215.

A parity check circuit 220 compares the number of edges that occur in each measurement scan cycle and will provide a scan error output on line 222 should an incorrect number of pulses be detected, thus indicating that the measurement scan was improperly or incompletely made. The parity check circuit 220 is controlled by the wire jumpers 225 so that the circuit 65 shown in FIG. 11 may be used when the dimension of more than one article are to be determined simultaneously.

The outputs of edge counter 210, shown as waveforms N-Q in FIG. 6, are applied on an edge counter decoder circuit 230, the outputs of which are applied through a programming wire jumper circuit 235 to gate generator 215.

Figure 5:
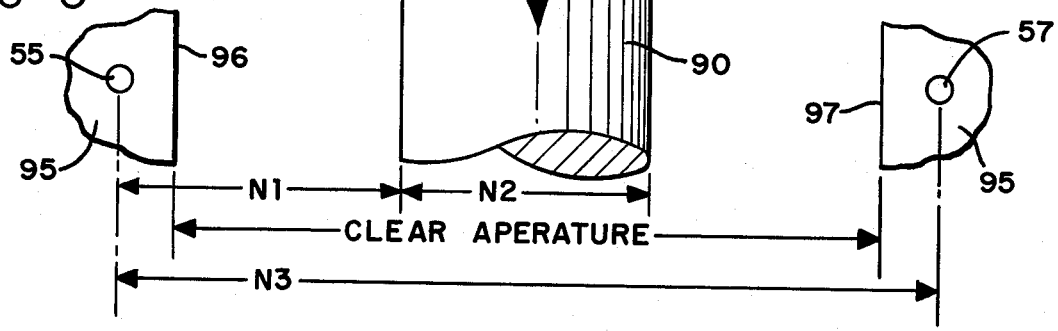
FIG. 5 is a view showing an object to be measured placed within the zone of measurement and its relationship to the grate which was temporarily installed in FIG. 4.

The gate generator 213 has three outputs, labeled N1, N2 and N3 as shown by the waveforms R, S and T in FIG. 6, and these outputs, representing the dimensions N1, N2 and N3 shown in FIG. 5, are applied to the gated counter circuits 240, 241 and 242, respectively. The gate generator, the gated counters and edge counter are reset by a signal or line 243 from the microprocessors 70 prior to each measurement scan cycle.

Each gated counter 240-242 is provided with pulses from a crystal controlled clock or pulse generator means 245. The number of pulses from the clock stored in each of the gated counter circuits during their respective time intervals is made available to a data multiplexer 250. The microprocessor 70 provides address signals to the multiplexer 250 on lines 252 and 253, and the selected information is carried to the microprocessor 70 on line 251.

Thus, the gated counter 240 can accumulate clock pulses from the pulse generator 245 only during the period N1, as shown in waveform R of FIG. 6; the gated counter 241 can accumulate pulses only during the period N2 shown in waveform S of FIG. 6; and the gated counter 242 may accumulate pulses during the period N3 shown in waveform T of FIG. 6.

Thus, the counter 242 stores the total number of pulses occurring between the beginning and the end of each measurement scan cycle (N3); counter 240 stores the number of pulses occurring between the beginning of the scan cycle to one edge of the article (N1); and counter 241 stores the number of pulses occurring as the beam scans from one edge to the other of the article (N2).

The gate generator 215 provides an output on line 244 after all of the information needed to determine the dimension of the article has been stored in the gated counters, and this signal is represented by the waveform U in FIG. 6.

Reference is now made to FIG. 12 which shows one form of microprocessor which may be used in connection with the present invention. The microprocessor 70 includes an input circuit 270 connected to the scan error line 222, the data ready line 244 and the data input cable 251. This input circuit directs these signals on cable 272 to a microprocessor 275 which, in the preferred embodiment of this invention, is a type M6800 microprocessor integrated circuit chip manufactured by Motorola. The microprocessor chip output on line 277 is connected to output circuit 280 which provides the reset signal on line 243 and the data select command signals on 252 and 253 to the multiplex circuit 250 within the data acquisition circuit 65.

The microprocessor is also provided with a random access memory circuit 285, a read only memory circuit 290 and clock 295.

Figure 13:
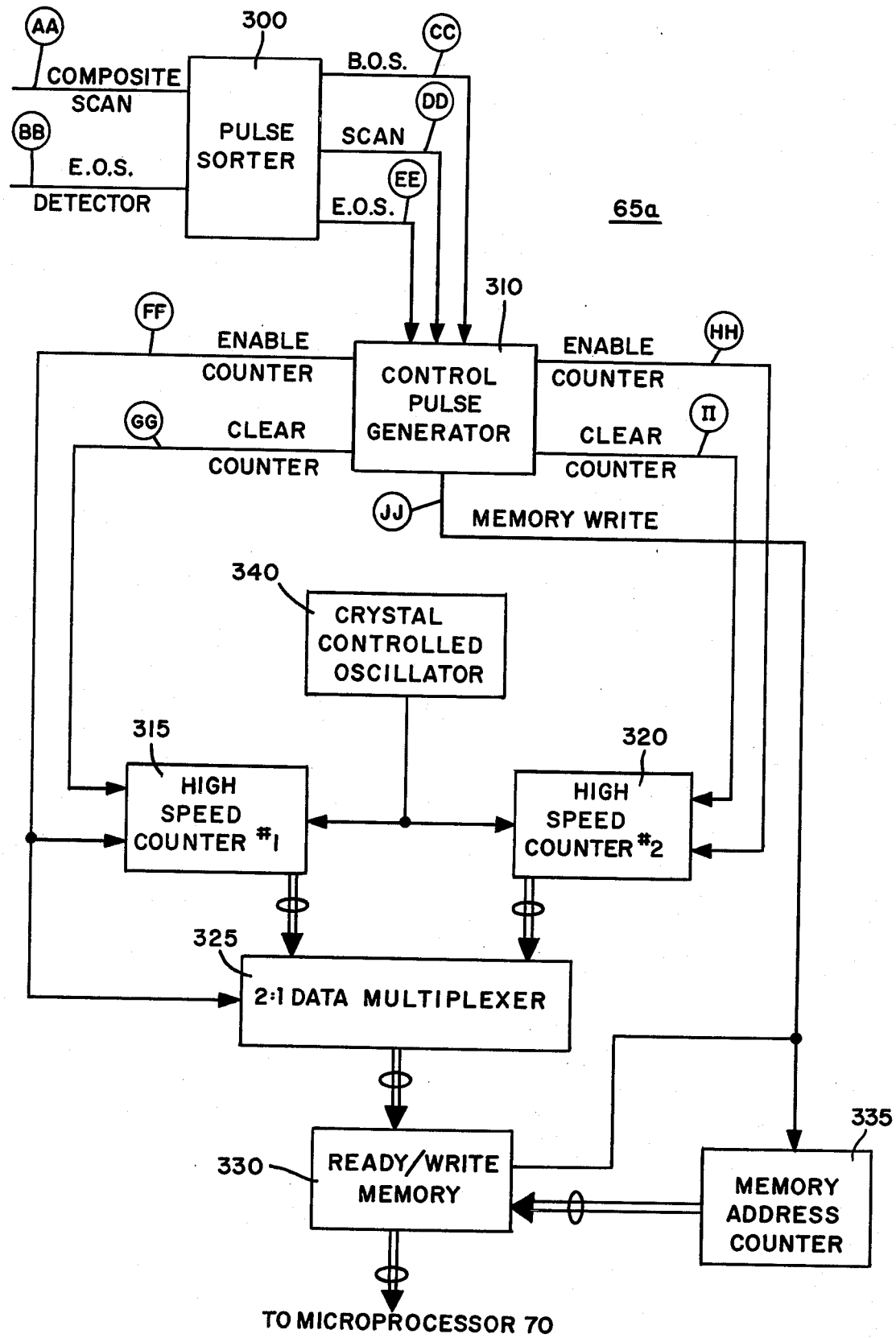
FIG. 13 is an electrial block diagram of a special data acquisition circuit used during the initial calibration of the optical micrometer.
Figure 14:
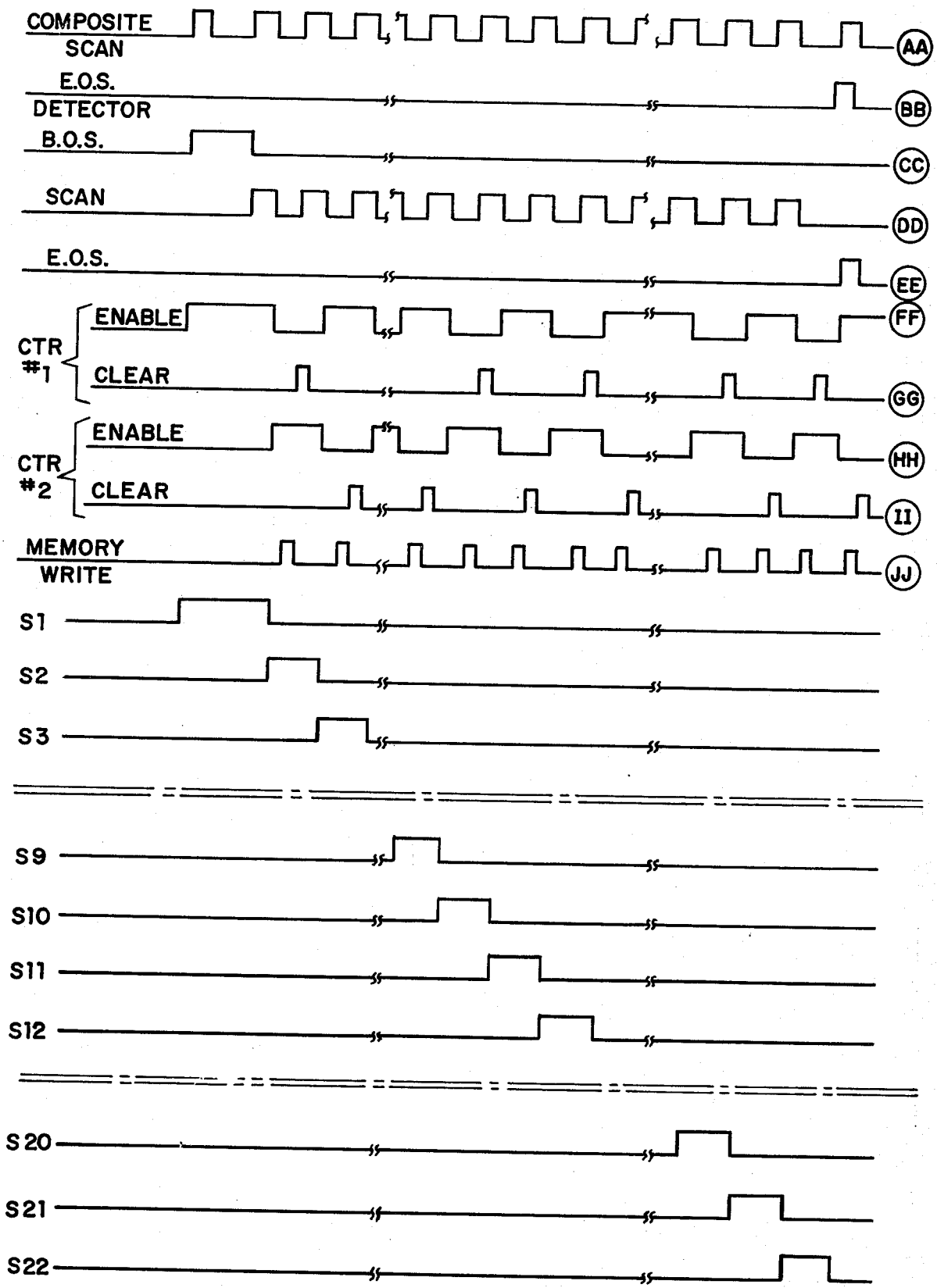
FIG. 14 are waveform diagrams representing the output of various electrical components within the circuit of FIG. 14.

Initial calibration of the optical micrometer is accomplished by placing, on a one time basis, a precision grate 80 within the measurement zone, as shown in FIGS. 2 and 4. Referring to the block diagram of FIG. 13 which is a special data acquisition circuit used in the initial calibration of the optical micrometer, and to the waveform diagram of FIG. 14, the composite scan signal (waveform AA) and a signal derived from the end of scan photodetector 57 (waveform BB) are applied to a pulse sorter circuit 300. The pulse sorter has three outputs, one is the beginning-of-scan signal (waveform CC), the second is derived from the scan photodetector 50 (waveform DD), and the third is an end-of-scan signal (waveform CC).

The outputs of the pulse sorter 300 have each been processed by the half maximum threshold circuit of FIG. 7, and therefore the beginning edges of each of these pulses is precisely related to the actual position of either the beginning-of-scan and end-of-scan photodetectors or the segments of the precision grate 80. On the other hand, the waveform BB is a raw, unprocessed signal, and this signal will occur in time approximately one microsecond ahead of the processed end-of-scan signal (waveform EE) due to the delay balance circuit 150 shown in FIG. 7.

The outputs of the pulse sorter 300 are applied to a control pulse generator 310 which provides signals to control the operation of high speed counters 315 and 320, a two-to-one data multiplexer 325, a memory 330 and a memory address counter 335. A crystal oscillator 340 is connected as an input to the high speed counters 315 and 320.

The beginning-of-scan signal on line CC initiates the outputs from the control pulse generator 310, and its output on line FF is applied as an enabling signal to the high speed counter 315 and to the multiplexer 325. This enabling signal on line FF is generated for each of the periods S1, S3, S5, etc. Period S1 is the time required for the beam to traverse the distance between the beginning-of-scan photodetector 55 and the first completely dark segment of grate 80; the other periods represent the time required for the beam to traverse a segment of the grate. During the time the enable signal is present, the counter 315 will receive pulses from the crystal controlled oscillator 340, and therefore the number of pulses stored in the counter represents the time interval. After the enable signal is removed, the control pulse generator will generate a memory write signal on line JJ to cause the contents of the counter 315 to be directed through the data multiplexer 325 and to a memory location in the memory 330 as determined by the memory address counter 335. Thereafter, a clear pulse is generated on line GG to reset the counter 315 preparatory to receiving the next count.

The second high speed counter 320 operates in a similar manner by accumulating the number of clock pulses during alternate segments of the grate, i.e., segments S2, S4, etc. Period S22 is the time required for the beam to traverse the distance from the last black band to the end-of-scan photodetector 57. Thus, the counter 320 is enabled by the signal on line HH, transfers its contents to the memory 330 in response to the signal on line JJ and is cleared by a signal on line II.

The circuitry described above uses two high speed counters and a memory having a plurality of memory addresses to accumulate the number of pulses in each of the intervals S1 through S22. Since the distance between the beginning-of-scan photodetector 55 and the first complete segment of the grate, and the distance from the last segment of the grate and the end-of-scan photodetector 57 are not precisely known, the values of S1 and S22 may differ substantially from each other and from the values obtained for the other segments.

The total number of clock pulses occurring as the beam scans from the beginning-of-scan photodetector 55 to the end-of-scan photodetector 57 is recorded as a number Nt in the read only memory 290; and this number is used as a reference against which all other subsequent measurements are compared to compensate for any variations in the rate at which the beam is scanned between these two photodetectors and thus across the zone of measurement.

Due to non-linearities in the optical system, it is not only possible but likely that the number of pulses between any two segments of the precision grating will not be equal; however, these non-linearities can be compensated for and a readout obtained of the dimension of the article subsequently placed in the zone of measurement to a higher degree of accuracy than previously obtainable by using the method hereinafter described.

Table I represents the number of pulses which might be obtained during each of the intervals S1 through S22 of a typical calibration scan cycle. Alternatively, the number of pulses could be accumulated in 22 separate counters, and this would produce the value C1 through C22 as represented in Table II. Also, the number C1 through C22 could be obtained by accumulating the numbers of Table I within the microprocessor.

It will be understood by those skilled in the art that either technique of recording the calibration information could be employed, and a computer program designed to use the information from either Table I or II to compensate for any non-linearities in the scan rate of the beam.

By way of example, it will be assumed for illustration purposes that the read only memory 290 in the microprocessor includes the electrical equivalent of Table II, that the optical micrometer has a two inch aperture and that the segments of the grating 80 are positioned 0.100 inch apart.

TABLE I

| | # OF PULSES DURING CALIBRATION SCAN CYCLE | |
|---|---|---|
| S1 | = | 4450 |
| S2 | = | 1300 |
| S3 | = | 1300 |
| S4 | = | 1325 |
| S5 | = | 1350 |
| S6 | = | 1375 |
| S7 | = | 1400 |
| S8 | = | 1425 |
| S9 | = | 1450 |
| S10 | = | 1500 |
| S11 | = | 1550 |
| S12 | = | 1600 |
| S13 | = | 1600 |
| S14 | = | 1550 |
| S15 | = | 1500 |
| S16 | = | 1450 |
| S17 | = | 1425 |
| S18 | = | 1400 |
| S19 | = | 1375 |
| S20 | = | 1350 |
| S21 | = | 1325 |
| S22 | = | 7000 |

TABLE II

| ACCUMULATED PULSES DURING CALIBRATION SCAN CYCLE | |
|---|---|
| C1 | 4450 |
| C2 | 5750 |
| C3 | 7050 |
| C4 | 8375 |
| C5 | 9725 |
| C6 | 11100 |
| C7 | 12500 |
| C8 | 13925 |
| C9 | 15375 |
| C10 | 16875 |
| C11 | 18425 |
| C12 | 20025 |
| C13 | 21625 |
| C14 | 23175 |
| C15 | 24675 |
| C16 | 26125 |
| C17 | 27550 |
| C18 | 28950 |
| C19 | 30325 |
| C20 | 31675 |
| C21 | 33000 |
| C22 | 40000 |

If the article 90 is positioned in the zone of measurement as shown in FIG. 5, the first edge of the part is located a distance N1 from the beginning-of-scan photodetector 55, and this corresponds to a location between segments 9 and 10 of the precision grating when it was located in the zone of measurement during the calibration scan cycle. The other edge of the part is positioned a distance N2 from the first edge and corresponds in location to a point between segments 13 and 14 of the precision grating.

Assume for purposes of explanation only that during the calibration scan cycle, the number of pulses obtained of the precision grate is as indicated in Table I, and the total number of pulses for the interval Nt is 40,000. If during a measurement scan cycle of the article 90, the number of pulses in the interval N1 = 17,000, N2 = 6000, and N3 = 42,000, then the dimension of the article may be calculated in the following manner.

First, it will be seen by reference to the total number of pulses N3 in the measurement scan cycle that the beam is scanning slower during the measurement scan cycle than during the calibration scan cycle since more pulses from the clock 245 are counted as the beam scans the distance between the photodetectors 55 and 57.

Thus, the ratio between 40,000 (Nt) and 42,000 (N3) may be used to correct the other readings since it is assumed that scan speed variations are long term variations and the scan speed does not change significantly during any single scan cycle.

$R = Nt/N3$ $N'1 = R \times N1 = (0.952)(17,000) = 16190$ $N'2 = R \times N2 = (0.952)(6,000) = 5714$ $N'1 + N'2 = 21,904.$ Thus, it can be determined from Table I that the adjusted value for the leading edge (N'1) of the article (16190 pulses) is positioned between segments 9 (15375 pulses) and 10 (16875 pulses) and the trailing edge (N'1 + N'2) (21904 pulses) is positioned between segments 13 (21625 pulses) and 14 (23175 pulses). Between segments 9 and 10 there are 1500 pulses; and between segments 13 and 14 there are 1550 pulses. The distance between each segment is 0.100 inch in this example.

The leading edge of the part is $(16190 - 15375)/1500 = 0.54$ of the distance between segments 9 and 10 (i.e., 0.954 inch from the first segment of the grating); and the trailing edge of the part is $(21904 - 21525)/1550 = 0.18$ of the distance between segments 13 and 14 (i.e., 1.318 inch from the first segment).

The dimension of the part is therefore $1.318 - 0.954 = 0.364$ inch.

The following program listing incorporates the above teachings and represents a typical program for an optical micrometer having a fourteen inch aperture and a calibrating device temporarily placed in the zone of measurement with segments at 0.700 inch spacing. The program listing is specifically used with a Motorola 6800 microprocessor with read-only memories at addresses F800 through FFFF, random access memory at addresses 0000 through 00FF and PIA at addresses 4004 and 4008. The input-output devices 270 and 280 are preferably Motorola 6820s.

| SYMBOL TABLE | |
|---|---|
| 0000 | N1 |
| 0002 | N2 |
| 0004 | N3 |
| 000E | RATIO |
| 0010 | DIVS |
| 0012 | DIVID |
| 0012 | MTEMP |
| 0016 | DCOUNT |
| 001A | TTEMP |
| 0022 | NEW |
| 003E | DDCNT |
| 003F | MASK |
| F980 | MULA |
| F990 | DIVA |
| FC40 | LOOP |
| FD00 | LASCAL |
| FDA4 | LOOKUP |
| FE2B | GETN |
| FE4B | DIV |
| FE8C | MUL |
| FEB2 | NORM |
| FEC0 | TABLE |

| MACHINE LANGUAGE | TAG | PROGRAM LISTING MNEMONICS | | COMMENTS |
|---|---|---|---|---|
| FC40/ | | | | |
| C603 | LOOP: | LDAB | #03 | ;SCAN READY SIGNAL |
| BDFF00 | | JSR | MPX | ;FROM HIGH SPEED F/E |
| B64008 | | LDAA | at#4008 | |
| 2BFB | | BMI | $-5 | ;WAIT FOR READY |
| CE0000 | | LDX | #00 | ;GET N1 |
| C601 | | LDAB | #01 | |
| BDFE2B | | JSR | GETN | |
| CE0002 | | LDX | #02 | ;GET N2 |
| C602 | | LDAB | #02 | |
| BDFE2B | | JSR | GETN | |
| CE0004 | | LDX | #04 | ;GET N3 |
| C603 | | LDAB | #03 | |
| BDFE2B | | JSR | GETN | |
| C600 | | LDAB | #00 | ;CLEAR SELECT LINES |
| BDFF00 | | JSR | MPX | |
| 7F4005 | | CLR | at#4005 | |
| C607 | | LDAB | #07 | ;ISSUE CLEAR PULSE |
| BDFF00 | | JSR | MPX | ;TO HIGH SPEED F/E |
| 8601 | | LDAA | #01 | |
| B74004 | | STAA | at#4004 | |
| B74005 | | STAA | at#4005 | |
| 7F4004 | | CLR | at#4004 | |
| B74005 | | STAA | at#4005 | |
| C603 | | LDAB | #03 | ;SCAN BUSY SIGNAL |
| BDFF00 | | JSR | MPX | |
| B64008 | | LDAA | at#4008 | |
| 2AFB | | BPL | $-5 | ;WAIT FOR BUSY |

-continued

| MACHINE LANGUAGE | TAG | MNEMONICS | | COMMENTS |
|---|---|---|---|---|
| BDFD00 | | JSR | LASCAL | ;CALCULATE DIAMETER |
| 7EFC40 | | JMP | LOOP | ;CONTINUE SCAN |
| FE2B/ | | | | |
| 37 | GETN: | PSHB | | ;GET Nn SUBROUTINE |
| 5F | | CLRB | | |
| BDFF00 | | JSR | MPX | |
| 33 | | PULB | | |
| F74005 | | STAB | at#4005 | |
| C601 | | LDAB | #01 | |
| BDFF00 | | JSR | MPX | |
| B64008 | | LDAA | at#4008 | ;BRING IN Nn |
| A701 | | STAA | 1,X | ;SAVE |
| C605 | | LDAB | #05 | |
| BDFF00 | | JSR | MPX | |
| B64008 | | LDAA | at#4008 | |
| A700 | | STAA | O,X | ;SAVE |
| 39 | | RTS | | ;RETURN FROM SUBRTN. |
| FF00/ | | | | |
| 58 | MPX: | ASLB | | ;I/O MPX SUBROUTINE |
| 17 | | TBA | | |
| 8408 | | ANDA | #08 | |
| 8AC0 | | ORAA | #C0 | |
| B74006 | | STAA | at#4006 | |
| 58 | | ASLB | | |
| 17 | | TBA | | |
| 8408 | | ANDA | #08 | |
| 8AC3 | | ORAA | #c3 | |
| B7400A | | STAA | at#400A | |
| 58 | | ASLB | | |
| 17 | | TBA | | |
| 8408 | | ANDA | #08 | |
| 8AC3 | | ORAA | #C3 | |
| B7400B | | STAA | at#400B | |
| 39 | | RTS | | ;RETURN FROM SUBRTN. |
| FD00/ | | | | |
| 9605 | LASCAL: | LDAA | N3+1 | ;CALCULATE RATIO |
| D604 | | LDAB | N3 | ;BETWEEN NORM |
| CEFEB2 | | LDX | #NORM | ;AT CALIBRATION |
| BDF990 | | JSR | DIVA | ;AND N3 |
| DE14 | | LDX | DIVID+2 | |
| DFOE | | STX | RATIO | ;STORE RATIO |
| CE000E | | LDX | #RATIO | |
| D600 | | LDAB | N1 | |
| 9601 | | LDAA | N1+1 | ;ADJUST N1 |
| BDF980 | | JSR | MULA | ;BY RATIO |
| D700 | | STAB | N1 | |
| 9701 | | STAA | N1+1 | ;STORE ADJUSTED N1 |
| D602 | | LDAB | N2 | |
| 9603 | | LDAA | N2+1 | ;ADJUST N2 |
| BDF980 | | JSR | MULA | ;BY RATIO |
| D702 | | STAB | N2 | |
| 9703 | | STAA | N2+1 | ;STORE ADJUSTED N2 |
| D604 | | LDAB | N3 | |
| 9605 | | LDAA | N3+1 | ;ADJUST N3 |
| BDF980 | | JSR | MULA | ;BY RATIO |
| D704 | | STAB | N3 | |
| 9705 | | STAA | N3+1 | ;STORE ADJUSTED N3 |
| D600 | | LDAB | N1 | |
| 9601 | | LDAA | N1+1 | |
| 9B03 | | ADDA | N2+1 | ;N1+N2 |
| D902 | | ADCB | N2 | |
| D702 | | STAB | N2 | |
| 9703 | | STAA | N2+1 | ;STORE IN N2 |
| DE00 | | LDX | N1 | |
| DF12 | | STX | MTEMP | |
| BDFDA4 | | JSR | LOOKUP | ;CALCULATE N1 |
| D700 | | STAB | N1, | |
| 9701 | | STAA | N1$^0$1 | ;STORE IN N1 |
| DE02 | | LDX | N2 | |
| DF12 | | STX | MTEMP | |
| BDFDA4 | | JSR | LOOKUP | ;CALCULATE N2 |
| 9001 | | SUBA | N1+1 | |
| D200 | | SBCB | N1 | ;SUBTRACT CALC. N1 |
| D722 | | STAB | NEW | ;STORE DIAMETER |
| 9723 | | STAA | NEW+1 | ;READIND IN NEW |
| 39 | | RTS | | ;RETURN FROM SUBRTN. |
| F980/ | | | | |
| 36 | MULA: | PSHA | | ;16 bit MULTIPLY |
| 8610 | | LDAA | #16. | |
| 973E | | STAA | DDCNT | |
| 32 | | PULA | | |
| BDFE8C | | JSR | MUL | |
| 36 | | PSHA | | |
| 860C | | LDAA | #12. | |
| 973E | | STAA | DDCNT | |
| 32 | | PULA | | |
| 39 | | RTS | | ;RETURN FROM SUBRTN. |
| 36 | DIVA: | PSHA | | ;16 bit DIVIDE |
| 8610 | | LDAA | #16. | |
| 973E | | STAA | DDCNT | |
| 86FF | | LDAA | #FF | |

-continued

| MACHINE LANGUAGE | TAG | PROGRAM LISTING MNEMONICS | | COMMENTS |
|---|---|---|---|---|
| 973F | | STAA | MASK | |
| 32 | | PULA | | |
| 54 | | LSRB | | |
| 46 | | RORA | | |
| BDFE4B | | JSR | DIV | |
| 36 | | PSHA | | |
| 860C | | LDAA | #12. | |
| 973E | | STAA | DDCNT | |
| 860F | | LDAA | #0F | |
| 973F | | STAA | MASK | |
| 32 | | PULA | | |
| 39 | | RTS | | ;RETURN FROM SUBRTN. |
| FDA4/ | | | | |
| B6FED4 | LOOKUP: | LDAA | MIDDLE | ;LINEARIZE THROUGH |
| 9112 | | CMPA | MTEMP | ;TABLE LOOKUP |
| 2511 | | BCS | LKHIGH | ;AND INTERPOLATION |
| B6FECA | LKLOW: | LDAA | TBMIDL | |
| 9112 | | CMPA | MTEMP | |
| 2505 | | BCS | LKHLW | |
| CEFEBE | LKLLW: | LDX | #TBLLW-2 | |
| 2018 | | BRA | SEARCHO | |
| CEFEDE | LKHIGH: | LDAA | TBMIDH | |
| 9112 | | CMPA | MTEMP | |
| 2505 | | BCS | LKHHG | |
| CEFED4 | LKLHG: | LDX | #TBLHG-2 | |
| 2007 | | BRA | SEARCHO | |
| CEFEDE | LKHHG: | LDX | #TBHHG-2 | |
| 2002 | | BRA | SEARCHO | |
| 08 | SEARCH: | INX | | |
| 08 | | INX | | |
| A602 | SEARCHO | LDAA | 2,X | |
| 9112 | | CMPA | MTEMP | ;LOCATE ENTRY |
| 25F8 | | BCS | SEARCH | ;IN TABLE |
| DF1A | | STX | TTEMP | ;SAVE LOCATION |
| E602 | | LDAB | 2,X | ;IN TABLE |
| A603 | | LDAA | 3,X | |
| A001 | | SUBA | 1,X | ; CALCULATE DIFFERENCE |
| E200 | | SBCB | 0,X | ;BETWEEN ADJOINING |
| 37 | | PSHB | | ;ENTRIES IN |
| 36 | | PSHA | | ;THE TABLE |
| D612 | | LDAB | MTEMP | ;CALCULATE |
| 9613 | | LDAA | MTEMP+1 | ;FRACTIONAL |
| A001 | | SUBA | 1,X | ;ENTRY IN |
| E200 | | SBCB | 0,X | ;TABLE |
| CE0012 | | LDX | #MTEMP | |
| D712 | | STAB | MTEMP | |
| 9713 | | STAA | MTEMP+1 | |
| 32 | | PULA | | |
| 33 | | PULB | | |
| BDFE4B | | JSR | DIV | |
| D61B | | LDAB | TTEMP+1 | |
| C0C0 | | SUBB | #TABLE | |
| 58 | | ASLB | | |
| 58 | | ASLB | | |
| DB14 | | ADAB | DIVID+2 | |
| 9615 | | LDAA | DIVID+3 | |
| 39 | | RTS | | ;RETURN FROM SUBRTN. |
| FEB2/ | | | | |
| 531D | NORM: | 42555. | | ;N3 AT CALIBRATION |
| FEC0/ | | | | |
| 02AF | TABLE: | 687. | | ;SIMILAR TO TABLE 2 |
| 0ACD | | 2765. | | ; IN TEXT |
| 12EA | | 4842. | | |
| 1B05 | | 6917. | | |
| 2318 | | 8984. | | |
| 2B26 | TBMIDL: | 11046. | | |
| 3334 | TBHLW: | 13108. | | |
| 3B44 | | 15172. | | |
| 4355 | | 17237. | | |
| 4B66 | | 19302. | | |
| 5377 | MIDDLE: | 21367. | | |
| 5B87 | TBLHG: | 23431. | | |
| 6398 | | 25496. | | |
| 6BA7 | | 27559. | | |
| 73B6 | | 29622. | | |
| 7BC3 | TBMIDH: | 31683. | | |
| 83CF | TBHHG: | 33743. | | |
| 8BD8 | | 35800. | | |
| 93E9 | | 37865. | | |
| 9C00 | | 39936. | | |
| A416 | | 42006. | | |
| AC04 | | 44036. | | |
| FE4B/ | | | | |
| D710 | DIV: | STAB | DIVS | ;12 bit DIVIDE |
| 9711 | | STAA | DIVS+1 | ;GET DIVISOR |
| A600 | | LDAA | 0,X | ;GET DIVIDEND |
| 9712 | | STAA | DIVID | |
| A601 | | LDAA | 1,X | |
| 9713 | | STAA | DIVID+1 | |
| 4F | | CLRA | | |

-continued

| MACHINE LANGUAGE | TAG | PROGRAM LISTING | | 
|---|---|---|---|
| | | MNEMONICS | COMMENTS |
| 9714 | | STAA | DIVID+2 |
| 9715 | | STAA | DIVID+3 |
| 963E | | LDAA | DDCNT |
| 9716 | | STAA | DCOUNT |
| D612 | DLOOP; | LDAB | DIVID |
| 9613 | | LDAA | DIVID+1 |
| 9011 | | SUBA | DIVS+1 | ;SUBTRACT DIVSR. |
| D210 | | SBCB | DIVS | |
| 2504 | | BCS | $+4 | ;BRANCH ON BORROW |
| D712 | | STAB | DIVID | ;SAVE DIVIDEND |
| 9713 | | STAA | DIVID+1 | |
| 790015 | | ROL | DIVID+3 | ;SHIFT DIVIDEND |
| 790014 | | ROL | DIVID+2 | |
| 790013 | | ROL | DIVID+1 | |
| 790012 | | ROL | DIVID | |
| 7A0016 | | DEC | DCOUNT | ;DECR. LOOP COUNT |
| 26E1 | | BNE | DLOOP | ;CONTINUE UNTIL |
| 730015 | | COM | DIVID+3 | ;FINISHED |
| 9614 | | LDAA | DIVID+2 | ;COMPLEMENT TO |
| 983F | | FORA | MASK | ;GET QUOTIENT |
| 9714 | | STAA | DIVID+2 | |
| CE0014 | | LDX | #DIVID+2 | |
| 39 | | RTS | | ;RETURN FROM SUBRTN. |
| FE8C/ | | | | |
| D710 | MUL: | STAB | DIVS | ;12 bit MULTIPLY |
| 9711 | | STAA | DIVS+1 | ;GET MULTIPLICAND |
| E600 | | LDAB | 0,X | ;GET MULTIPLIER |
| D714 | | STAB | DIVID+2 | |
| A601 | | LDAA | 1,X | |
| 9715 | | STAA | DIVID+3 | |
| 963E | | LDAA | DDCNT | |
| 9716 | | STAA | DCOUNT | |
| 4F | | CLRA | | |
| 5F | | CLRB | | |
| 56 | MLOOP; | RORB | | ;SHIFT |
| 46 | | RORA | | |
| 760014 | | ROR | DIVID+2 | |
| 760015 | | ROR | DIVID+3 | |
| 2404 | | BCC | $+4 | |
| 9B11 | | ADDA | DIVS+1 | ;ADD |
| D910 | | ADCB | DIVS | |
| 7A0016 | | DEC | DCOUNT | ;DECR. LOOP COUNT |
| 26ED | | BNE | MLOOP | |
| 39 | | RTS | | ;RETURN FROM SUBRTN. |

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. A method of measuring the dimensions of articles placed within the zone of measurement of an optical micrometer including the steps of
scanning a beam of light through the zone of measurement;
determining the beginning and end of each scan cycle;
generating clock pulses which are equally spaced in time;
calibrating the optical micrometer by:
temporarily introducing a grate into the optical path within the zone of measurement, the grate having a plurality of alternate light transmitting and opaque segments spaced a predetermined distance apart;
recording the total number of clock pulses (Nt) occurring in a calibration scan cycle;
recording the number of clock pulses occurring in the interval between the beginning of the calibration scan cycle and in each segment of the grate;
thereafter measuring the dimensions of articles placed in the zone of measurement by:
temporarily recording the number of clock pulses (N1) occurring in the interval between the beginning of the measurement scan cycle and the first edge of the article, the number of pulses (N2) occurring in the interval as the beam scans from the first to the last edge of the article, and the total number of pulses (N3) occurring in the measurement scan cycle;
determining the ratio (R) of the total pulses in the calibration scan cycle and the total pulses in the measurement scan cycle (Nt/N3);
multiplying the ratio (R) times the numbers N1 and N2 to obtain adjusted numbers N'1 and N'2 independent of the scan speed of the beam,
comparing the numbers N'1 and N'2 with the numbers previously recorded during the calibration scan cycle to determine the position of the edges of the article relative to the location of the segments of the previously installed grate; and
determining therefrom the dimension of the article placed in the zone of measurement.

2. In an optical micrometer of the type including an optical system for causing a light beam to be scanned across an article placed in a zone of measurement to determine its dimension wherein the rate of movement of the beam through the zone of measurement might not be linear,
the improvement comprising
sensing means for indicating the beginning and the end of each scan cycle and the amplitude of the beam passing through the zone of measurement,
memory means responsive to said sensing means for storing a number of pulses from a pulse generating means occurring from the beginning to the end of a calibration scan cycle and during each of a plurality of precisely dimensioned segments positioned temporarily within the zone of measurement, storage means responsive to a pulse generating means and said sensing means for storing the total number of pulses occurring between the beginning and the end of each measurement scan cycle and the number of pulses occurring from the beginning or end of the scan cycle and each edge of the article, and circuit means responsive to the numbers stored in said storage means and said memory means for providing a linearized output which represents accurately the dimension of an article placed in the zone of measurement independently of its position therein.

3. In an optical micrometer of the type including means for scanning a light beam across an article placed in a zone of measurement to determine its dimension wherein the rate of movement of the beam through the zone of measurement may not be linear, the improvement comprising sensing means for indicating the beginning and the end of each scan cycle and the presence of the beam passing through the zone of measurement, memory means responsive to a pulse generating means and said sensing means for recording the number of pulses occurring from the beginning to the end of a calibration scan cycle and during each of a plurality of precisely dimensioned segments positioned temporarily within the zone of measurement, pulse generating means, storage means responsive to said pulse generating means and said sensing means for storing the total number of pulses occurring between the beginning and the end of each measurement scan cycle, storing the number of pulses occurring from the beginning or end of the scan cycle to one edge of the article, and storing a number representing the pulses occurring as the beam scans from one edge to the other of the article, and circuit means responsive to the numbers stored in said storage means and said memory means for providing a linearized output which represents accurately the dimension of an article placed in the zone of measurement independently of its position therein.

4. The optical micrometer of claim 3 wherein said sensing means includes first and second photodetector elements for detecting the beam prior to and after it moves through the zone of measurement thereby to define the beginning and end of each scan cycle and a third photodetector element for sensing the amplitude of the beam passing through the zone of measurement.

* * * * *